US 9,825,547 B2

(12) United States Patent
Chiang et al.

(10) Patent No.: US 9,825,547 B2
(45) Date of Patent: Nov. 21, 2017

(54) UNIDIRECTIONAL ISOLATED MULTI-LEVEL DC-DC CONVERTER AND METHOD THEREOF

(71) Applicant: Ablerex Electronics Co., Ltd., New Taipei (TW)

(72) Inventors: Wen-Jung Chiang, New Taipei (TW); Kuo-Fang Huang, New Taipei (TW); Wen-Chung Chen, New Taipei (TW)

(73) Assignee: Ablerex Electronics Co., Ltd., New Taipei (TW)

(*) Notice: Subject to any disclaimer, the term of this patent is extended or adjusted under 35 U.S.C. 154(b) by 0 days.

(21) Appl. No.: 15/202,622

(22) Filed: Jul. 6, 2016

(65) Prior Publication Data

US 2017/0207712 A1   Jul. 20, 2017

(30) Foreign Application Priority Data

Jan. 15, 2016 (TW) .............................. 105101270 A

(51) Int. Cl.
*H02M 3/335* (2006.01)
*H02M 1/14* (2006.01)
*H02M 1/12* (2006.01)

(52) U.S. Cl.
CPC ......... *H02M 3/33546* (2013.01); *H02M 1/12* (2013.01); *H02M 1/14* (2013.01)

(58) Field of Classification Search
CPC ....... H02M 3/33546; H02M 1/12; H02M 1/14
USPC .................................................. 363/21.04
See application file for complete search history.

(56) References Cited

U.S. PATENT DOCUMENTS

| | | | |
|---|---|---|---|
| 2003/0038612 A1* | 2/2003 | Kutkut | H02M 3/33561 320/140 |
| 2005/0207180 A1* | 9/2005 | Pansier | H02M 3/337 363/16 |
| 2008/0062724 A1* | 3/2008 | Feng | H02J 7/35 363/17 |
| 2012/0033451 A1* | 2/2012 | Usui | H02M 1/4258 363/21.02 |

(Continued)

OTHER PUBLICATIONS

Received STIC search report from EIC 2800 searcher John DiGeronimo on Apr. 4, 2017.*

*Primary Examiner* — Timothy J Dole
*Assistant Examiner* — Htet Z Kyaw
(74) *Attorney, Agent, or Firm* — Alan D. Kamrath; Kamrath IP Lawfirm, P.A.

(57) ABSTRACT

A multi-level DC-DC converter device includes an inverter, a 3-winding high-frequency transformer, a first full-bridge rectifier, a second full-bridge rectifier, a selective circuit and a filter circuit. A first winding at a primary side of the high-frequency transformer connects with the inverter while a second winding and a third winding of at a secondary side of the high-frequency transformer connect with the first full-bridge rectifier and the second full-bridge rectifier. The selective circuit connects with DC output ports of the first full-bridge rectifier and the second full-bridge rectifier, thereby operationally selecting two serially-connected full-bridge rectifiers or single full-bridge rectifier to output two voltage levels performed as a multi-level output voltage. The filter circuit connects between the selective circuit and a load for filtering harmonics and outputting a DC voltage.

17 Claims, 5 Drawing Sheets

(56) References Cited

U.S. PATENT DOCUMENTS

2012/0087157 A1* 4/2012 Huang ............... H02M 7/5387
                                                363/37
2016/0065081 A1* 3/2016 Raju ................. H02M 3/33569
                                                363/21.1

* cited by examiner

UNIDIRECTIONAL ISOLATED MULTI-LEVEL DC-DC CONVERTER AND METHOD THEREOF

BACKGROUND OF THE INVENTION

1. Field of the Invention

The present invention relates to a unidirectional isolated multi-level DC-DC converter and control method thereof. Particularly, the present invention relates to the unidirectional isolated multi-level DC-DC converter and control method thereof for reducing the dimensions. More particularly, the present invention relates to the unidirectional isolated multi-level DC-DC converter and control method thereof for minimizing a ripple quantity of output voltages and output currents.

2. Description of the Related Art

Generally, a conventional isolated DC-DC converter has been widely used in various industrial fields. Even though the conventional isolated DC-DC converter has a specific advantageous of simple and easy control, it has several drawbacks in operation, including low efficiencies, high ripple quantities, high electromagnetic interference and requiring the use of a filter circuit with a large capacity. Conversely, a conventional multi-level DC-DC converter has several advantageous of relatively higher efficiencies, relatively lower electromagnetic interference and allowing the use of a filter circuit with a relatively lower capacity even though it has a drawback of requiring sophisticated control.

For example, FIG. 1 shows a schematic view of a conventional multi-level DC-DC converter in accordance with the prior art. Referring initially to FIG. 1, the multi-level DC-DC converter 1 includes a dual half-bridge inverter 11, a dual high-frequency transformer 12, a full-bridge rectifier 13 and an output filter circuit 14 which are combined to form the multi-level DC-DC converter 1. In addition, the dual half-bridge inverter 11 must be constructed with four power switches and four capacitors.

With continued reference to FIG. 1, the dual half-bridge inverter 11 is formed from two separate half-bridge inverters serially connected. The dual high-frequency transformer 12 includes two high-frequency transformers each of which connects with an AC end of each half-bridge inverter of the dual half-bridge inverter 11. In power conversion operation, the power switches of the dual half-bridge inverter 11 are controllably switched such that the dual high-frequency transformer 12 can generate three levels of voltages at its primary side. Furthermore, the full-bridge rectifier 13 is utilized to rectify the three levels of voltages to thereby generate two voltage levels at a secondary side of the dual high-frequency transformer 12.

Disadvantageously, the two half-bridge inverters of the dual half-bridge inverter 11 require a sophisticated control manner and an arrangement of the four capacitors. However, the four capacitors may possess four different capacitances which may result in different voltages of the four capacitors and requiring more sophisticated control manner. In addition, the two high-frequency transformers of the dual high-frequency transformer 12 require using two iron cores which will result in increasing of manufacturing cost and dimensions.

However, there is a need of improving the conventional multi-level DC-DC converter and conversion method thereof. The above-mentioned prior art is incorporated herein by reference for purposes including, but not limited to, indicating the background of the present invention and illustrating the situation of the art.

As is described in greater detail below, the present invention provides a unidirectional isolated multi-level DC-DC converter and control method thereof. The unidirectional isolated multi-level DC-DC converter is formed with an inverter, a 3-winding high-frequency transformer, a first full-bridge rectifier, a second full-bridge rectifier, a selection circuit and a filter circuit. Only one of inverter and one of high-frequency transformer is provided to simplify a structure of the unidirectional isolated multi-level DC-DC converter. The selection circuit is provided to generate a low-harmonic pulse voltage to the filter circuit to thereby allow using a low capacity of the filter circuit in such a way as to overcome the problems of the conventional multi-level DC-DC converter and conversion method thereof multi-level DC-DC converter and conversion method thereof.

SUMMARY OF THE INVENTION

The primary objective of this invention is to provide a unidirectional isolated multi-level DC-DC converter and control method thereof. The unidirectional isolated multi-level DC-DC converter is formed with an inverter, a 3-winding high-frequency transformer, a first full-bridge rectifier, a second full-bridge rectifier, a selection circuit and a filter circuit. Only one of inverter and one of high-frequency transformer is provided to simplify a structure of the unidirectional isolated multi-level DC-DC converter. The selection circuit is further provided to generate a low-harmonic pulse voltage to the filter circuit to thereby allow using a low capacity of the filter circuit. Advantageously, the unidirectional isolated multi-level DC-DC converter and conversion method of the present invention is successful in minimizing the dimensions, reducing the manufacturing cost and enhancing the operational efficiency.

The unidirectional isolated multi-level DC-DC converter in accordance with an aspect of the present invention includes:

an inverter connected with a power source, with the inverter including an AC output end from which to generate a fixed pulse-width high-frequency AC voltage;

a 3-winding high-frequency transformer including a primary side and a secondary side, with the primary side having a first winding, with the first winding connecting with the AC output end of the inverter, with the secondary side having a second winding and a third winding;

a first full-bridge rectifier including a first input end connected with the second winding of the secondary side of the 3-winding high-frequency transformer, with the first full-bridge rectifier further including a first DC positive output end and a first DC negative output end of a first DC output port, with the first DC positive output end and the first DC negative output end connecting with a first capacitor in parallel to generate a first output DC voltage;

a second full-bridge rectifier including a second input end connected with the third winding of the secondary side of the 3-winding high-frequency transformer, with the second full-bridge rectifier further including a second DC positive output end and a second DC negative output end of a second DC output port, with the second DC positive output end and the second DC negative output end connecting with a second capacitor in parallel to generate a second output DC voltage, with the second DC positive output end of the second full-bridge rectifier further connected with the first DC negative output end of the first full-bridge rectifier;

a selection circuit including a first input end, a second input end and an output end, with the first input end of the selection circuit connected with the first DC positive output end of the first full-bridge rectifier, with the second input end of the selection circuit connected with the second DC positive output end of the second full-bridge rectifier; and a filter circuit connected with the output end of the selection circuit and the second DC negative output end of the second full-bridge rectifier.

In a separate aspect of the present invention, the inverter is selected from a half-bridge inverter or a full-bridge inverter.

In a further separate aspect of the present invention, a DC output voltage of the selection circuit is controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

In yet a further separate aspect of the present invention, the voltage drop is generated from a diode.

In yet a further separate aspect of the present invention, the selection circuit includes a power electronic switch and a diode, with the power electronic switch connected between the first input end and the output end of the selection circuit.

In yet a further separate aspect of the present invention, the diode includes an anode and a cathode, with the anode connecting with the second input end of the selection circuit and the cathode connecting with the output end of the selection circuit.

In yet a further separate aspect of the present invention, a power electronic switch of the selection circuit controls a DC output voltage of the selection circuit controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

In yet a further separate aspect of the present invention, the filter circuit includes an inductor and a capacitor.

The control method of the unidirectional isolated multi-level DC-DC converter in accordance with an aspect of the present invention includes:

providing an inverter, a 3-winding high-frequency transformer, a first full-bridge rectifier, a second full-bridge rectifier, a selection circuit and a filter circuit, with the selection circuit including a first input end, a second input end and an output end;

connecting the inverter with a power source, with the inverter including an AC output end from which to generate a fixed pulse-width high-frequency AC voltage;

providing a first winding at a primary side of the 3-winding high-frequency transformer and providing a second winding and a third winding at a secondary side of the 3-winding high-frequency transformer, with the first winding connecting with the AC output end of the inverter;

connecting a first input end of the first full-bridge rectifier with the second winding of the secondary side of the 3-winding high-frequency transformer, with the first full-bridge rectifier further including a first DC positive output end and a first DC negative output end of a first DC output port, with the first DC positive output end and the first DC negative output end connecting with a first capacitor in parallel to generate a first output DC voltage;

connecting a second input end of the second full-bridge rectifier with the third winding of the secondary side of the 3-winding high-frequency transformer, with the second full-bridge rectifier further including a second DC positive output end and a second DC negative output end of a second DC output port, with the second DC positive output end and the second DC negative output end connecting with a second capacitor in parallel to generate a second output DC voltage, with the second DC positive output end of the second full-bridge rectifier further connected with the first DC negative output end of the first full-bridge rectifier;

connecting the first input end of the selection circuit with the first DC positive output end of the first full-bridge rectifier and connecting the second input end of the selection circuit with the second DC positive output end of the second full-bridge rectifier; and connecting the filter circuit with the output end of the selection circuit and the second DC negative output end of the second full-bridge rectifier;

controlling a DC output voltage of the selection circuit controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

In a separate aspect of the present invention, the voltage drop is generated from a diode.

In a further separate aspect of the present invention, the inverter is selected from a half-bridge inverter or a full-bridge inverter.

In yet a further separate aspect of the present invention, the selection circuit includes a power electronic switch and a diode, with the power electronic switch connected between the first input end and the output end of the selection circuit.

In yet a further separate aspect of the present invention, the diode includes an anode and a cathode, with the anode connecting with the second input end of the selection circuit and the cathode connecting with the output end of the selection circuit.

In yet a further separate aspect of the present invention, a power electronic switch of the selection circuit controls a DC output voltage of the selection circuit controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

In yet a further separate aspect of the present invention, the filter circuit includes an inductor and a capacitor.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a unidirectional isolated multi-level DC-DC converter, operation method and control method thereof in accordance with the preferred embodiment of the present invention can be applicable to various multi-level DC-DC converters or other equivalent devices, which are not limitative of the present invention.

Figure 1:
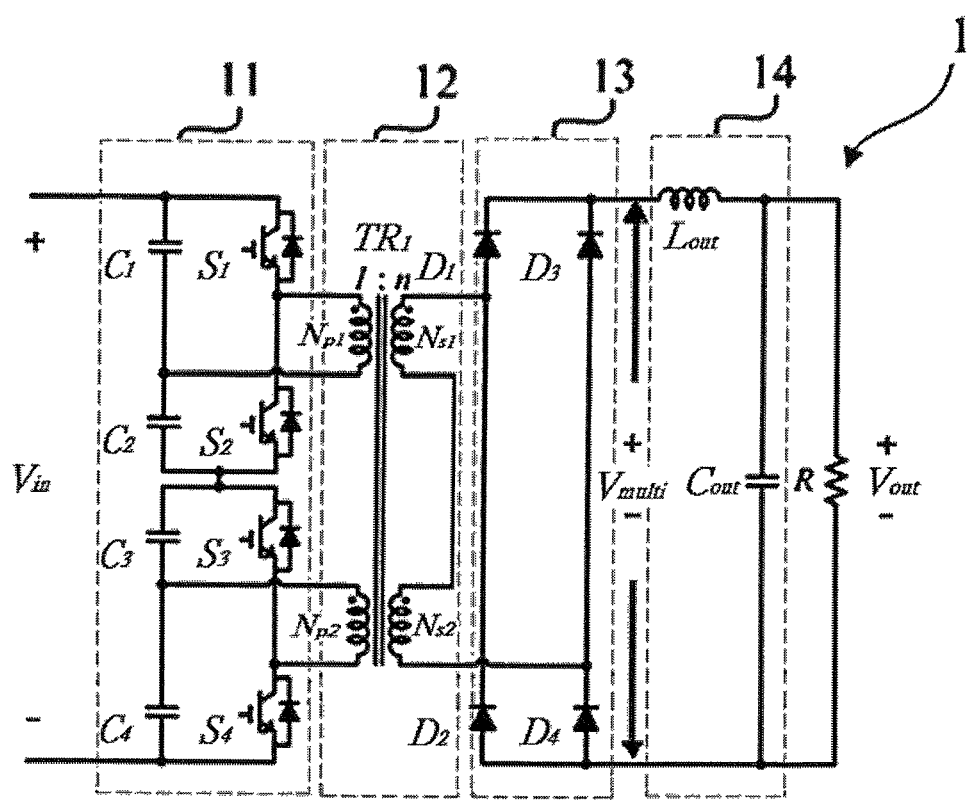
FIG. 1 is a schematic view of a conventional multi-level DC-DC converter in accordance with the prior art.
Figure 2:
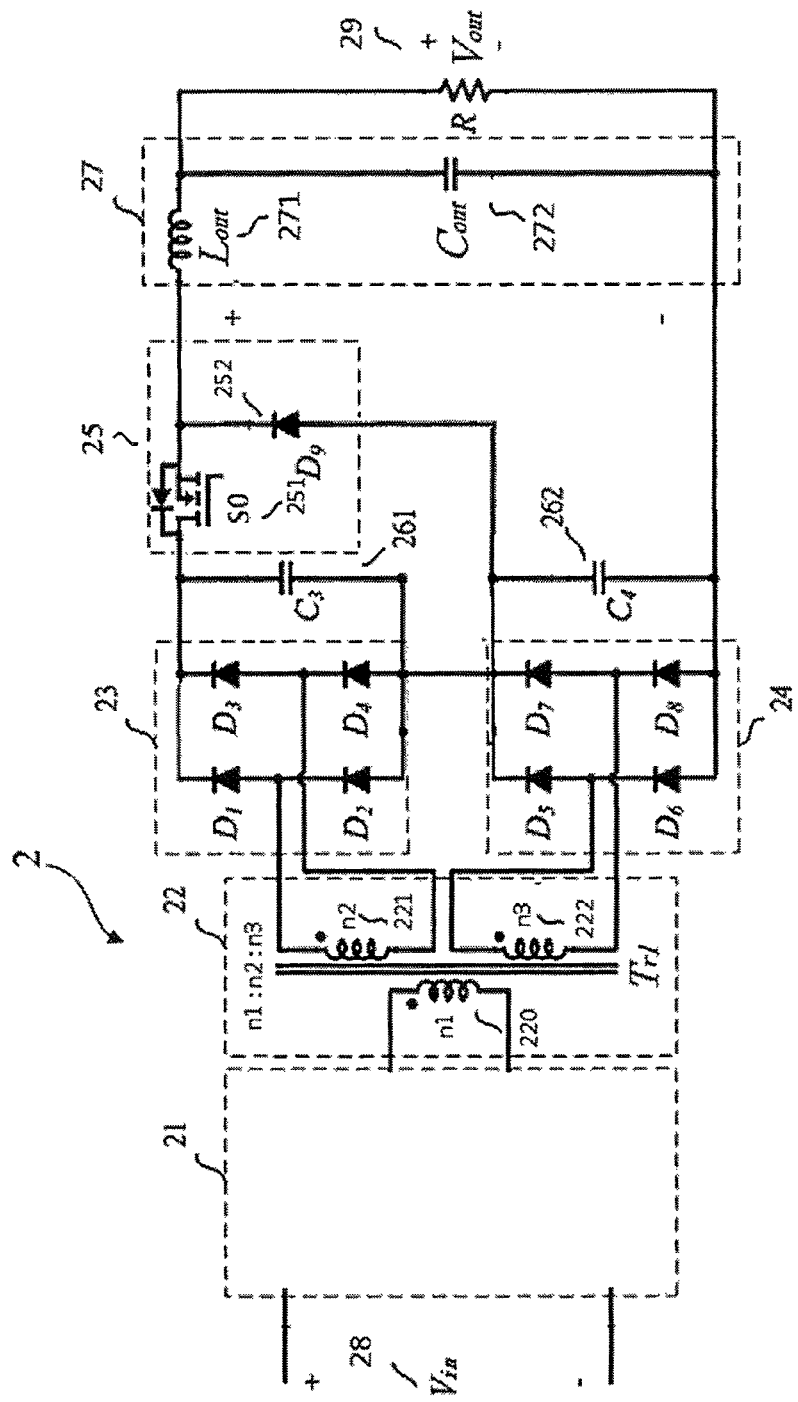
FIG. 2 is a schematic view of a unidirectional isolated multi-level DC-DC converter in accordance with a first preferred embodiment of the present invention.

FIG. 2 shows a schematic view of a unidirectional isolated multi-level DC-DC converter in accordance with a first preferred embodiment of the present invention. Referring now to FIG. 2, the unidirectional isolated multi-level DC-DC converter 2 in accordance with the first preferred embodiment of the present invention includes an inverter 21, a 3-winding high-frequency transformer 22, a first full-bridge rectifier 23, a second full-bridge rectifier 24, a selection circuit 25 and a filter circuit 27. The selection circuit 25 further includes a first input end, a second input end and an output end.

Figure 3A:
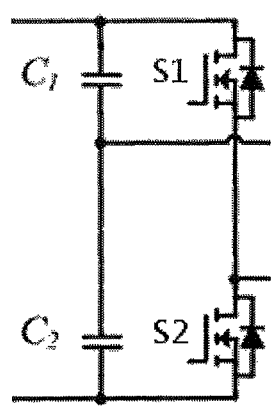
FIG. 3(A) is a schematic view of a half-bridge inverter applied in the unidirectional isolated multi-level DC-DC converter in accordance with the preferred embodiment of the present invention.
Figure 3B:
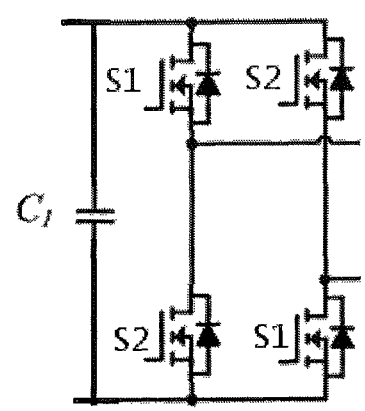
FIG. 3(B) is a schematic view of a full-bridge inverter applied in the unidirectional isolated multi-level DC-DC converter in accordance with the preferred embodiment of the present invention.

With continued reference to FIG. 2, by way of example, the inverter 21 is selected from a half-bridge inverter or a full-bridge inverter. In FIG. 3(A), a type of half-bridge inverter suitable for use in the unidirectional isolated multi-level DC-DC converter 2 is shown. The half-bridge inverter includes two power electronic switches and two capacitors connected thereto. In FIG. 3(B), a type of full-bridge inverter suitable for use in the unidirectional isolated multi-level DC-DC converter 2 is shown. The half-bridge inverter includes four power electronic switches and a capacitor connected thereto. The inverter 21 includes a DC input end at a first side and an AC output end at a second side. The DC input end of the inverter 21 further connects with a DC power source 28 in parallel for power inversion, as best shown in the left portion in FIG. 2. In addition, the AC output end of the inverter 21 is configured to supply a fixed pulse-width high-frequency AC voltage.

With continued reference to FIG. 2, by way of example, the 3-winding high-frequency transformer 22 has a primary side and a secondary side and includes a first winding 220 provided at the primary side, a second winding 221 and a third winding 222 provided at the secondary side. The first winding 220 connects with the AC output end of the inverter 21. Furthermore, the filter circuit 27 includes an inductor 271 and a capacitor 272 connected thereto, as best shown in the right portion in FIG. 2.

With continued reference to FIG. 2, by way of example, the first full-bridge rectifier 23 includes diodes D1, D2, D3, D4 connected in full bridge formation. A first AC input end of the first full-bridge rectifier 23 connects with the second winding 221 of the secondary side of the 3-winding high-frequency transformer 22. The first full-bridge rectifier 23 further includes a first DC positive output end and a first DC negative output end of a first DC output port which further connects with a first capacitor 261 in parallel to generate a first output DC voltage.

With continued reference to FIG. 2, by way of example, the second full-bridge rectifier 24 includes diodes D5, D6, D7, D8 connected in full bridge formation. A second input end of the second full-bridge rectifier 24 connects with the third winding 222 of the secondary side of the 3-winding high-frequency transformer 22. The second full-bridge rectifier 24 further includes a second DC positive output end and a second DC negative output end of a second DC output port which further connects with a second capacitor in parallel to generate a second output DC voltage. In addition, the second DC positive output end of the second full-bridge rectifier further connected with the first DC negative output end of the first full-bridge rectifier.

With continued reference to FIG. 2, by way of example, the selection circuit 25 includes a power electronic switch 251 and a diode 252 connected thereto. The power electronic switch 251 is provided between the first input end and the output end of the selection circuit 25. A first end of the power electronic switch 251 connects with the first DC positive output end of the first full-bridge rectifier 23, thereby forming the first input end of the selection circuit 25. The diode 252 includes an anode and a cathode. The anode of the diode 252 connects with the second DC positive output end of the second full-bridge rectifier 24, thereby forming the second input end of the selection circuit 25. A second end of the power electronic switch 251 connects with the cathode of the diode 252, thereby forming the output end of the selection circuit 25.

With continued reference to FIG. 2, by way of example, the power electronic switch 251 of the selection circuit 25 controls a DC output voltage of the selection circuit 25 controllably identical with a first voltage which is a sum of the first output DC voltage of the first full-bridge rectifier 23 and the second output DC voltage of the second full-bridge rectifier 24 or a second voltage which is the second output DC voltage of the second full-bridge rectifier 24 minus a predetermined voltage drop (or other voltage drop values), thereby outputting a multi-level DC output voltage varied from the first voltage to the second voltage and further supplying a DC voltage $V_{out}$ at an output end 29 via the filter circuit 27.

FIG. 3(A) shows a schematic view of a half-bridge inverter applied in the unidirectional isolated multi-level DC-DC converter in accordance with the preferred embodiment of the present invention. Similarly, FIG. 3(B) further shows a schematic view of a full-bridge inverter applied in the unidirectional isolated multi-level DC-DC converter in accordance with the preferred embodiment of the present invention.

Figure 4:
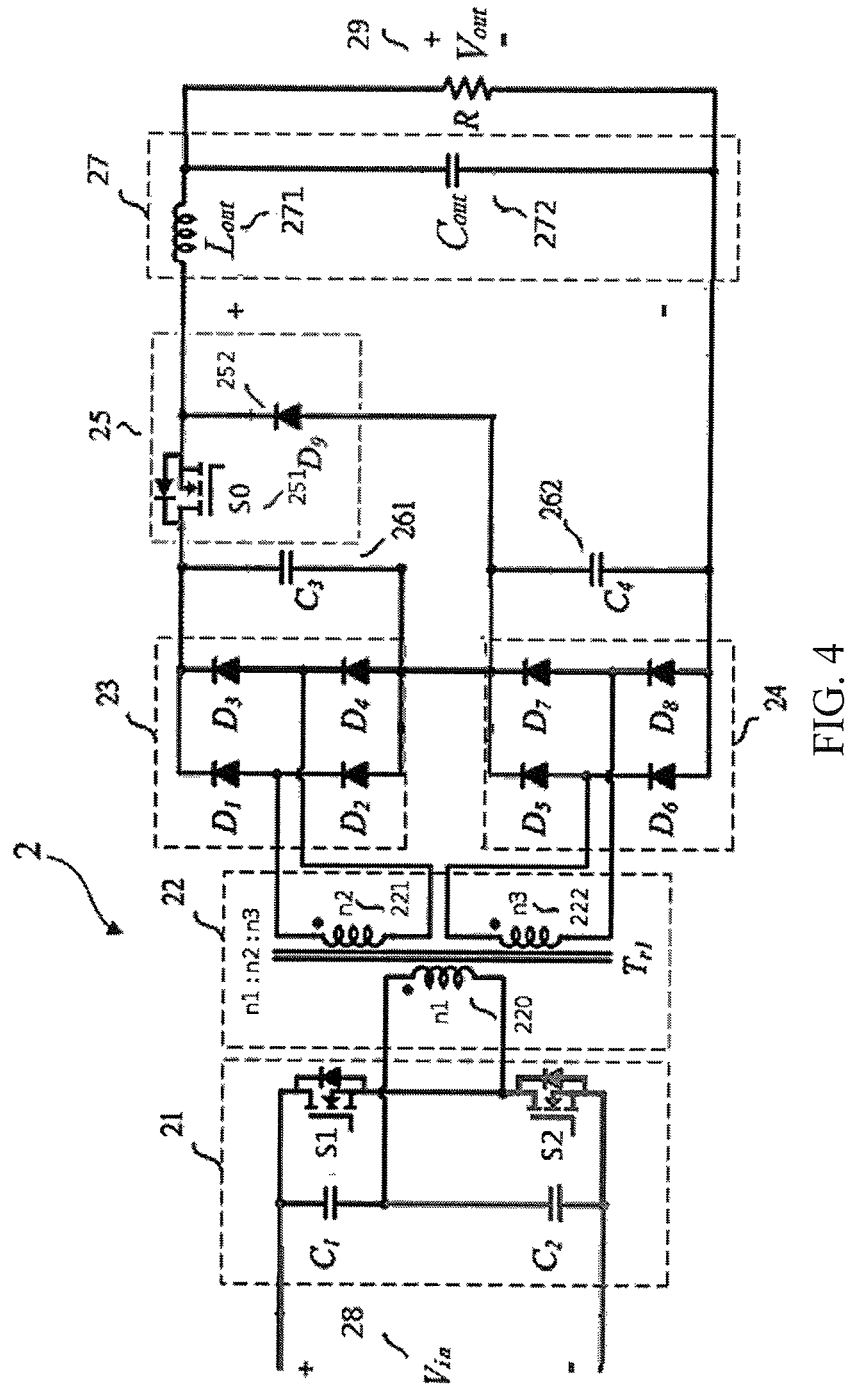
FIG. 4 is a schematic view of the unidirectional isolated multi-level DC-DC converter in accordance with a second preferred embodiment of the present invention.

FIG. 4 shows a schematic view of the unidirectional isolated multi-level DC-DC converter in accordance with a second preferred embodiment of the present invention. Referring to FIG. 4, in comparison with the first embodiment, the inverter 21 of the second preferred embodiment includes an upper power electronic switch S1, a lower power electronic switch S2 and two capacitors C1, C2.

Figures 5A, 5B, 5C:
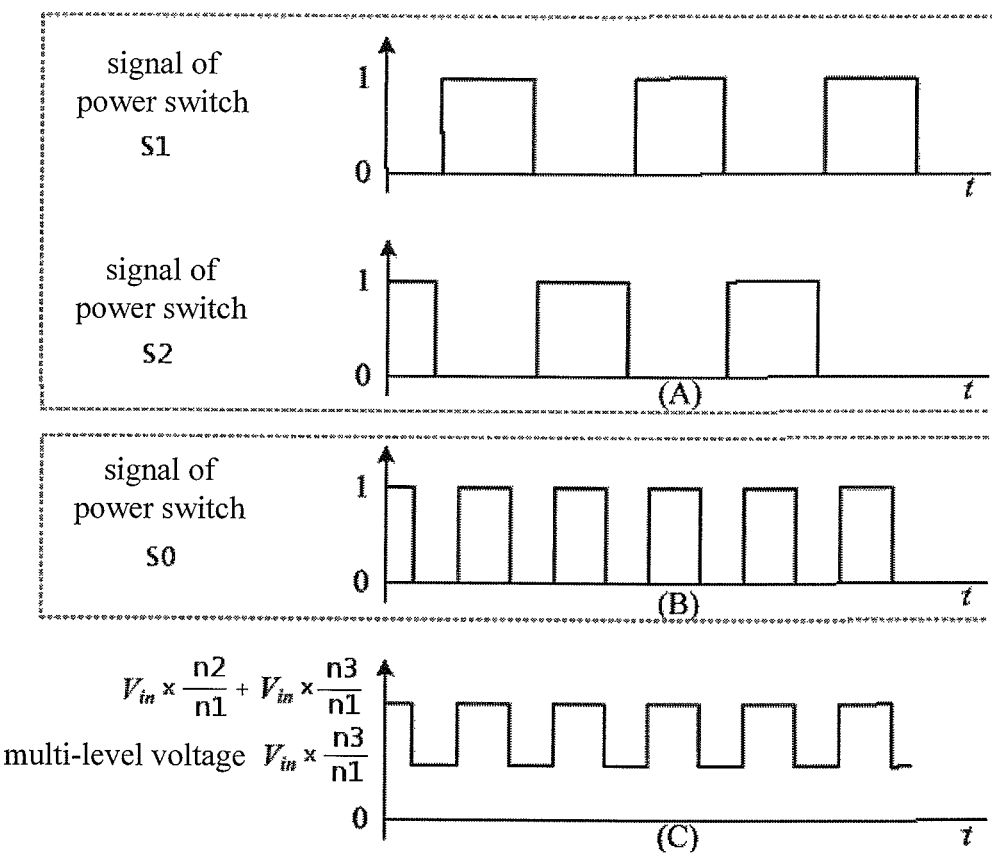
FIGS. 5(a)-5(c) are a series of waveform diagrams of signals of power switches and a waveform diagram of multi-level output voltage applied in a control method of the unidirectional isolated multi-level DC-DC converter in accordance with the preferred embodiment of the present invention.

FIGS. 5(a)-5(c) are a series of waveform diagrams of signals of power switches and a waveform diagram of multi-level output voltage applied in a control method of the unidirectional isolated multi-level DC-DC converter in accordance with the preferred embodiment of the present invention, corresponding to that shown in FIG. 4. Referring to FIGS. 4 and 5(A), the upper power electronic switch S1 and the lower power electronic switch S2 of the inverter 21 are alternatively switched by a fixed duty cycle of 0.5. Accordingly, the inverter 21 can supply a fixed-pulse-width high-frequency square-wave voltage to the first winding 220 of the 3-winding high-frequency transformer 22. Synchronously, the second winding 221 and the third winding 222 of the 3-winding high-frequency transformer 22 are inducted to thereby generate high-frequency square-wave voltages with an identical waveform. Further, the high-frequency square-wave voltages are passed through the first full-bridge rectifier 23 and the second full-bridge rectifier 24 to generate the first output DC voltage and the second output DC voltage, respectively. Suppose an input DC voltage is Vin and the first winding, second winding and third winding has turns ratio n1:n2:n3. The first output DC voltage is Vin*n2/n1 and the second output DC voltage is Vin*n3/n1. The first output DC voltage is Vin*n2/n1 may be equal to or less than the second output DC voltage minus the voltage of the diode 252. FIG. 5(B) show a waveform diagram of signals of the power electronic switch 251 of the selection circuit 25. By way of example, the signals of the power electronic switch 251 of the selection circuit 25 has a frequency of switching which is two times or may be increased by more times of that of the high-frequency square-wave voltage of the inverter 21, as best shown in FIGS. 5(A) and 5(B).

Referring again to FIGS. 4 and 5(A) to 5(C), when the power electronic switch 251 of the selection circuit 25 is switched on, the first output DC voltage and the second output DC voltage are serially connected to supply power. Consequently, the output voltage of the selection circuit 25 is a sum of the first output DC voltage and the second output DC voltage (Vin*n2/n1+Vin*n3/n1). Conversely, when the power electronic switch 251 of the selection circuit 25 is switched off, the second output DC voltage of the second full-bridge rectifier 24 must pass through the diode 252 to supply power. Consequently, the output voltage of the selection circuit 25 is the second output DC voltage of the second full-bridge rectifier 24 (Vin*n3/n1). The selection circuit 25 can supply two-level voltages to the filter circuit 27 to generate a DC voltage to a load (not shown). The DC voltage (Vin*n2/n1+Vin*n3/n1) must be higher than that supplied to the load and the DC voltage (Vin*n3/n1) must be lower than that supplied to the load.

The conventional isolated DC-DC converter supplies a zero voltage and a two-level DC voltage higher than that supplied to the load. However, the unidirectional isolated multi-level DC-DC converter of the present invention can supply the filter circuit 27 with the DC voltage relatively smaller than that of the conventional isolated DC-DC converter which results in smaller harmonic. Advantageously, the capacity of the filter circuit 27 can be reduced to compact dimensions, to lower manufacturing cost and to enhance operational efficiency.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. A unidirectional isolated multi-level DC-DC converter comprising:
   an inverter connected with a power source, with the inverter including an AC output end from which to generate a fixed pulse-width high-frequency AC voltage;
   a 3-winding high-frequency transformer including a primary side and a secondary side, with the primary side having a first winding, with the first winding connecting with the AC output end of the inverter, with the secondary side having a second winding and a third winding;
   a first full-bridge rectifier including a first input end connected with the second winding of the secondary side of the 3-winding high-frequency transformer, with the first full-bridge rectifier further including a first DC positive output end and a first DC negative output end of a first DC output port, with the first DC positive output end and the first DC negative output end connecting with a first capacitor in parallel to generate a first output DC voltage;
   a second full-bridge rectifier including a second input end connected with the third winding of the secondary side of the 3-winding high-frequency transformer, with the second full-bridge rectifier further including a second DC positive output end and a second DC negative output end of a second DC output port, with the second DC positive output end and the second DC negative output end connecting with a second capacitor in parallel to generate a second output DC voltage, with the second DC positive output end of the second full-bridge rectifier further connected with the first DC negative output end of the first full-bridge rectifier;
   a selection circuit including a first input end, a second input end and an output end, with the first input end of the selection circuit connected with the first DC positive output end of the first full-bridge rectifier, with the second input end of the selection circuit connected with the second DC positive output end of the second full-bridge rectifier; and
   a filter circuit connected with the output end of the selection circuit and the second DC negative output end of the second full-bridge rectifier.

2. The unidirectional isolated multi-level DC-DC converter as defined in claim 1, wherein the inverter is selected from a half-bridge inverter or a full-bridge inverter.

3. The unidirectional isolated multi-level DC-DC converter as defined in claim 1, wherein a DC output voltage of the selection circuit is controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

4. The unidirectional isolated multi-level DC-DC converter as defined in claim 1, wherein the voltage drop is generated from a diode.

5. The unidirectional isolated multi-level DC-DC converter as defined in claim 1, wherein the selection circuit includes a power electronic switch and a diode.

6. The unidirectional isolated multi-level DC-DC converter as defined in claim 5, wherein the power electronic switch connects between the first input end and the output end of the selection circuit.

7. The unidirectional isolated multi-level DC-DC converter as defined in claim 5, wherein the diode includes an anode and a cathode, with the anode connecting with the second input end of the selection circuit and the cathode connecting with the output end of the selection circuit.

8. The unidirectional isolated multi-level DC-DC converter as defined in claim 7, wherein the filter circuit includes an inductor and a capacitor.

9. The unidirectional isolated multi-level DC-DC converter as defined in claim 1, wherein a power electronic switch of the selection circuit controls a DC output voltage of the selection circuit controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

10. A control method of a unidirectional isolated multi-level DC-DC converter comprising:
providing an inverter, a 3-winding high-frequency transformer, a first full-bridge rectifier, a second full-bridge rectifier, a selection circuit and a filter circuit, with the selection circuit including a first input end, a second input end and an output end;
connecting the inverter with a power source, with the inverter including an AC output end from which to generate a fixed pulse-width high-frequency AC voltage;
providing a first winding at a primary side of the 3-winding high-frequency transformer and providing a second winding and a third winding at a secondary side of the 3-winding high-frequency transformer, with the first winding connecting with the AC output end of the inverter;
connecting a first input end of the first full-bridge rectifier with the second winding of the secondary side of the 3-winding high-frequency transformer, with the first full-bridge rectifier further including a first DC positive output end and a first DC negative output end of a first DC output port, with the first DC positive output end and the first DC negative output end connecting with a first capacitor in parallel to generate a first output DC voltage;
connecting a second input end of the second full-bridge rectifier with the third winding of the secondary side of the 3-winding high-frequency transformer, with the second full-bridge rectifier further including a second DC positive output end and a second DC negative output end of a second DC output port, with the second DC positive output end and the second DC negative output end connecting with a second capacitor in parallel to generate a second output DC voltage, with the second DC positive output end of the second full-bridge rectifier further connected with the first DC negative output end of the first full-bridge rectifier;
connecting the first input end of the selection circuit with the first DC positive output end of the first full-bridge rectifier and connecting the second input end of the selection circuit with the second DC positive output end of the second full-bridge rectifier;
connecting the filter circuit with the output end of the selection circuit and the second DC negative output end of the second full-bridge rectifier; and
controlling a DC output voltage of the selection circuit controllably identical with a first voltage which is a sum of the first output DC voltage and the second output DC voltage or a second voltage which is the second output DC voltage minus a voltage drop, thereby outputting a multi-level DC output voltage varied from the first voltage to the second voltage and further supplying the DC output voltage via the filter circuit.

11. The control method of a unidirectional isolated multi-level DC-DC converter as defined in claim 10, wherein the voltage drop is generated from a diode.

12. The control method of a unidirectional isolated multi-level DC-DC converter as defined in claim 10, wherein the inverter is selected from a half-bridge inverter or a full-bridge inverter.

13. The control method of a unidirectional isolated multi-level DC-DC converter as defined in claim 10, wherein the selection circuit includes a power electronic switch and a diode.

14. The control method of a unidirectional isolated multi-level DC-DC converter as defined in claim 13, wherein the power electronic switch connects between the first input end and the output end of the selection circuit.

15. The control method of a unidirectional isolated multi-level DC-DC converter as defined in claim 13, wherein the diode includes an anode and a cathode, with the anode connecting with the second input end of the selection circuit and the cathode connecting with the output end of the selection circuit.

16. The control method of a unidirectional isolated multi-level DC-DC converter as defined in claim 10, wherein a power electronic switch of the selection circuit controls the DC output voltage of the selection circuit controllably identical with the first voltage or the second voltage which is the second output DC voltage minus a voltage drop, thereby outputting the multi-level DC output voltage varied from the first voltage to the second voltage and further supplying the DC output voltage via the filter circuit.

17. The control method of a unidirectional isolated multi-level DC-DC converter as defined in claim 10, wherein the filter circuit includes an inductor and a capacitor.

* * * * *